US006978001B1

(12) United States Patent
Shaffer et al.

(10) Patent No.: US 6,978,001 B1
(45) Date of Patent: Dec. 20, 2005

(54) METHOD AND SYSTEM FOR CONTROLLING AUDIO CONTENT DURING MULTIPARTY COMMUNICATION SESSIONS

(75) Inventors: Shmuel Shaffer, Palo Alto, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 327 days.

(21) Appl. No.: 10/039,160

(22) Filed: Dec. 31, 2001

(51) Int. Cl.$^7$ ............................................. H04M 3/42
(52) U.S. Cl. ........................... 379/202.01; 379/203.01; 379/204.01; 379/205.01; 370/260
(58) Field of Search ...................... 379/202.01, 203.01, 379/204.01, 205.01; 370/260

(56) References Cited

U.S. PATENT DOCUMENTS

| | | | |
|---|---|---|---|
| 4,256,926 A | 3/1981 | Pitroda et al. ............... 379/269 |
| 4,894,824 A * | 1/1990 | Hemmady et al. ........... 370/380 |
| 5,450,481 A | 9/1995 | Penzias .................. 379/202.01 |
| 5,495,522 A | 2/1996 | Allen et al. ............. 379/202.01 |
| 5,548,638 A | 8/1996 | Yamaguchi et al. ... 379/202.01 |
| 5,561,737 A | 10/1996 | Bowen ....................... 704/27.5 |
| 5,596,634 A * | 1/1997 | Fernandez et al. ..... 379/210.01 |
| 5,668,863 A | 9/1997 | Bieselin et al. ........ 379/202.01 |
| 5,724,416 A | 3/1998 | Foladare et al. ....... 379/202.01 |
| 5,793,415 A | 8/1998 | Gregory, III et al. ...... 348/14.1 |
| 5,825,858 A | 10/1998 | Shaffer et al. ............... 379/120 |
| 5,852,656 A | 12/1998 | Sato et al. ................ 379/93.21 |
| 5,916,302 A | 6/1999 | Dunn et al. .................. 709/204 |
| 5,991,277 A | 11/1999 | Maeng et al. ................ 370/263 |
| 5,995,827 A | 11/1999 | Gitlin et al. ................. 455/416 |
| 6,091,714 A * | 7/2000 | Sensel et al. ................ 370/260 |
| 6,148,068 A | 11/2000 | Lowery et al. ......... 379/202.01 |
| 6,178,237 B1 * | 1/2001 | Horn ....................... 379/202.01 |
| 6,243,454 B1 | 6/2001 | Eslambolchi .......... 379/202.01 |
| 6,332,153 B1 | 12/2001 | Cohen ......................... 709/204 |
| 6,349,136 B1 | 2/2002 | Light et al. ............. 379/202.01 |
| 6,415,269 B1 * | 7/2002 | Dinwoodie .................... 705/37 |
| 6,453,022 B1 | 9/2002 | Weinman, Jr. ............ 379/88.13 |
| 6,457,045 B1 * | 9/2002 | Hanson et al. ............... 709/206 |
| 6,490,556 B1 | 12/2002 | Graumann et al. .......... 704/233 |
| 6,501,739 B1 | 12/2002 | Cohen ......................... 370/260 |
| 6,535,730 B1 | 3/2003 | Chow et al. ................. 455/416 |
| 6,556,670 B1 * | 4/2003 | Horn ....................... 379/202.01 |
| 6,563,916 B1 | 5/2003 | Deutsch et al. ......... 379/215.01 |
| 6,597,667 B1 | 7/2003 | Cerna .......................... 370/260 |

(Continued)

FOREIGN PATENT DOCUMENTS

| | | | |
|---|---|---|---|
| EP | 0 982 920 A2 | 3/2000 | ........... H04M 3/56 |
| EP | 1 156 647 A1 | 11/2001 | ........... H04M 3/428 |

OTHER PUBLICATIONS

U.S. Appl. No. 09/643,315, entitled "Apparatus and Method for Controlling an Audio Conference," filed Aug. 21, 2000, 42 pages, Aug. 21, 2000.
"Sametime Quick Start Guide 2.5 Release," XP-002239172, *Lotus Development Corporation,* Jul. 26, 2001, 24 pages.
International Search Report in International Patent Application No. PCT/US 02/39536, dated May 13, 2003, 7 pages.

*Primary Examiner*—Ahmad F. Matar
*Assistant Examiner*—Quynh H. Nguyen
(74) *Attorney, Agent, or Firm*—Baker Botts L.L.P.

(57) ABSTRACT

A method and system for controlling audio content during a multiparty communication session includes prompting active participants to the multiparty communication session to identify themselves. Media from a particular device from which no active participant is identified is disabled to terminate communication of the media from the particular device to other devices in the multiparty communication session.

50 Claims, 2 Drawing Sheets

U.S. PATENT DOCUMENTS

| | | | |
|---|---|---|---|
| 6,608,820 B1 | 8/2003 | Bradshaw, Jr. | 370/260 |
| 6,614,781 B1 | 9/2003 | Elliott et al. | 370/352 |
| 6,615,170 B1 | 9/2003 | Liu et al. | 704/233 |
| 6,628,767 B1 | 9/2003 | Wellner et al. | 379/202.01 |
| 6,650,745 B1 | 11/2003 | Bauer et al. | 379/202.01 |
| 2002/0191550 A1 | 12/2002 | Wilson | 370/260 |

* cited by examiner

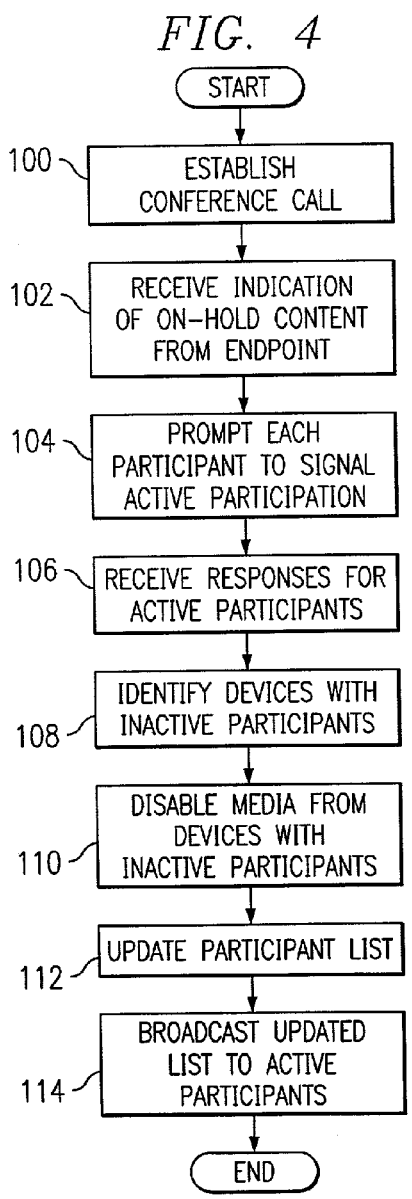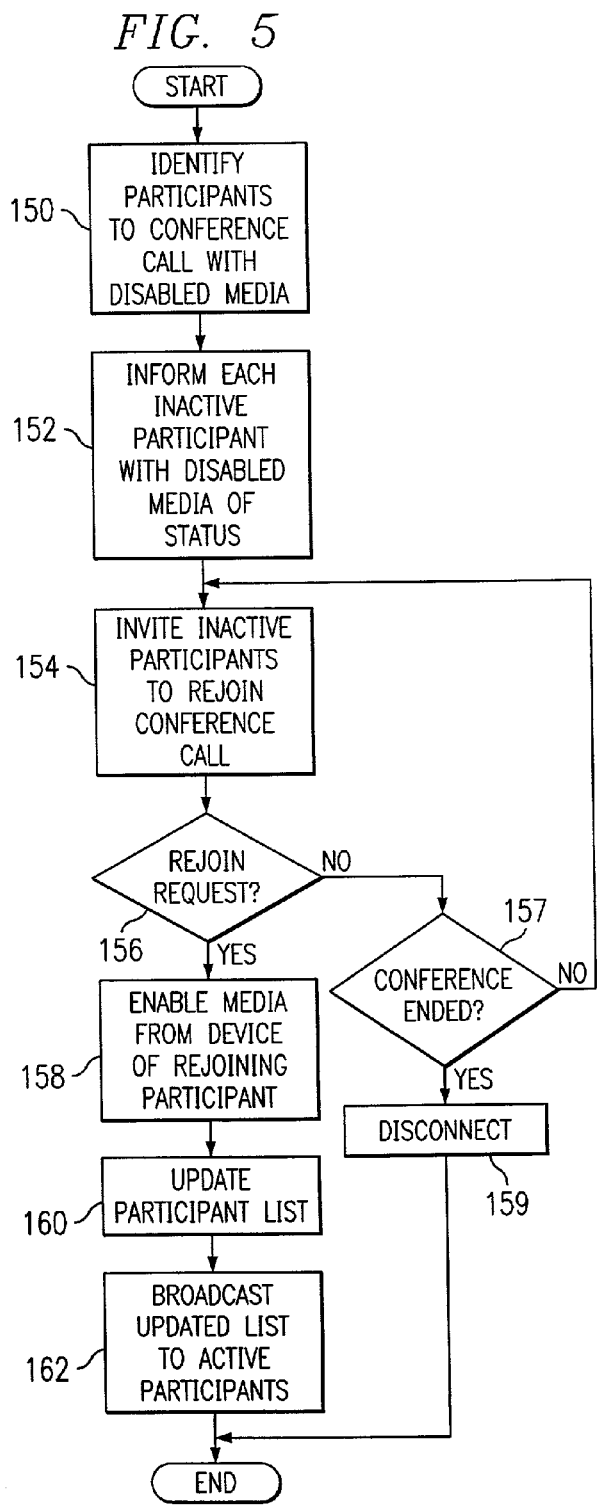

METHOD AND SYSTEM FOR CONTROLLING AUDIO CONTENT DURING MULTIPARTY COMMUNICATION SESSIONS

TECHNICAL FIELD OF THE INVENTION

The present invention relates generally to the field of multiparty communications, and more particularly to a method and system for controlling audio content during multiparty communication sessions.

BACKGROUND OF THE INVENTION

Consumers in businesses continue to demand more sophisticated communication systems that allow collaboration of voice, audio, and data. This demand fuels the development and deployment of new technologies that provide increased bandwidth and connectivity to end users. A conference call may now involve participants connecting using a variety of devices and technologies, and may also include other automated systems such as interactive voice response units, automated attendants, and other similar technologies. Communication providers face a challenge to integrate these different systems and provide reliable and effective control of participants and content in a conference.

SUMMARY OF THE INVENTION

The present invention provides a method and a system for controlling audio content during multiparty communication sessions that substantially eliminate or reduce the disadvantages and problems associated with previous systems and methods. In a particular embodiment, participants of a conference call or other suitable multiparty connection may initiate disablement of on-hold and other disruptive content without resorting to a call administrator.

In accordance with one embodiment of the present invention, a method and system for controlling audio content during a multiparty communication session includes prompting active participants in the multiparty communication session to identify themselves. Media for a particular device for which no active participant is identified is disabled to terminate communication of media from the particular device to other devices in the multiparty communication session.

More specifically, in accordance with a particular embodiment of the present invention, active users may be prompted to identify themselves in response to a request from a participant to the multiparty communication session. In this and other embodiments, media may be disabled from all devices for which no active participant is identified. A prompt may be played to the particular device for which the media was disabled inviting the participant to re-join the multiparty communication session. At any time and/or in response to a query, a list of active participants may be identified to any of the active participants.

Technical advantages of the present invention include providing a method and system for controlling audio content during multiparty communication sessions. In particular, media from on-hold endpoints may be disabled by participants to a multiparty communication session without resort to a call administrator. Thus, an administrator with special privileges is not needed for all conference calls. In addition, if an administrator is provided and puts the conference call on hold, media from the administrator may be disabled.

Another technical advantage of the present invention includes providing a method and system for controlling on-hold endpoints in a conference call that employs active users to signal their active participation to a conference controller. Particularly, active users identify themselves in response to a query by the conference controller. In this way, the port through which the disruptive music-on-hold is introduced is identified and may be disabled. Thus, participants in a "meet me" conference may eliminate such disruptive music-on-hold content. In addition, users in an ad-hoc conference may remove voice mail and any other automated recording system from participating in the conference call. In one embodiment, there is no requirement for any user to possess special privileges in order to handle users on-hold. In another embodiment, a level of authentication is provided.

Still another technical advantage of the present invention includes providing participants removed from a conference call with a mechanism to re-join the conference call after they have stopped the on-hold condition. In particular, on-hold endpoints may be periodically prompted to re-join the conference call and in response to a reply from a disabled endpoint, the endpoint may be re-enabled. Thus, users are only disabled while on-hold or otherwise streaming disruptive content to the conference call.

Various embodiments of the present invention may include some, all, or none of the above and elsewhere enumerated technical advantages of the present invention. In addition, other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 3 is a diagram illustrating details of the participant list of FIG. 2 in accordance with one embodiment of the present invention;

FIG. 4 is a flow diagram illustrating a method for disabling media from inactive participants to a conference call in accordance with one embodiment of the present invention; and FIG. 5 is a flow diagram illustrating a method for enabling media from active participants re-joining a conference call in accordance with one embodiment of the present invention.

DETAILED DESCRIPTION OF THE INVENTION

Figure 1:
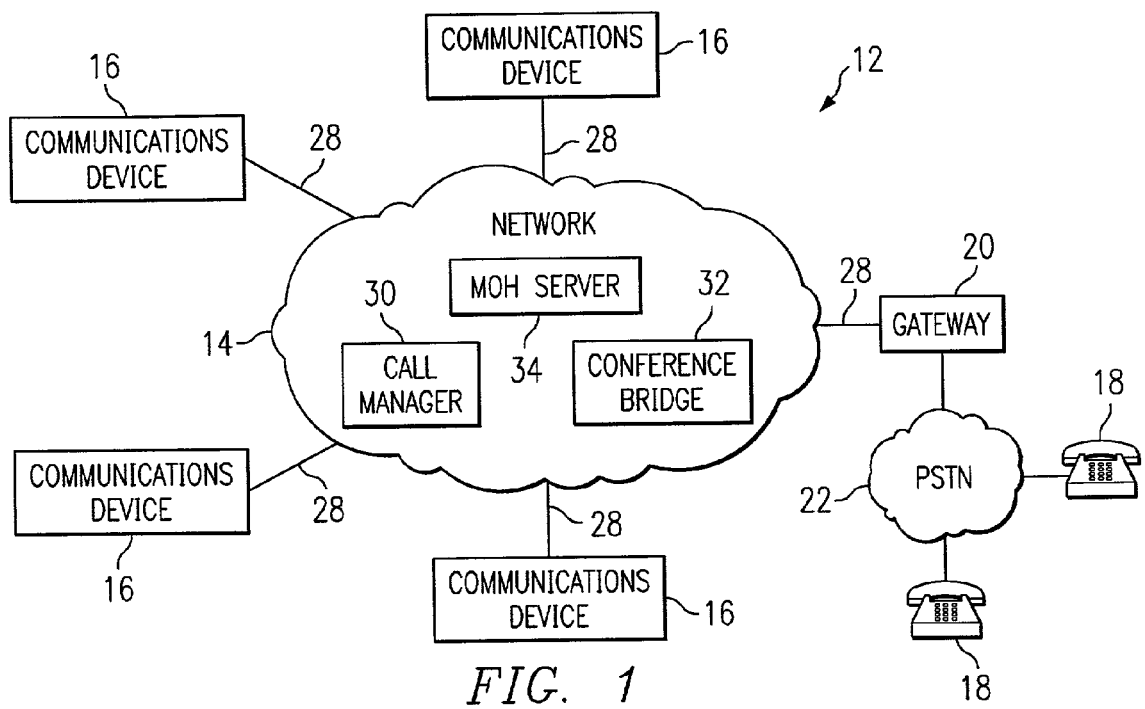
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non real-time traffic between source and destination endpoints.

Referring to FIG. 1, the communications system 12 includes a network 14 connecting a plurality of communication devices 16 to each other and to standard analog telephones 18 through a gateway 20 and the public switched telephone network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable wireline or wireless links 28.

In one embodiment, the network 14 is the Internet, a wide area network (WAN), a local area network (LAN) or other suitable packet-switched network. In the Internet embodiment, the network 14 transmits information in Internet Protocol (IP) packets. Telephony voice information is transmitted in the Voice over IP (VoIP) format. Real-time IP packets such as VoIP packets are encapsulated in real-time transport protocol (RTP) packets for transmission over the network 14. It will be understood that the network 14 may comprise any other suitable types of elements and links and that traffic may be otherwise suitably transmitted using other protocols and formats.

The communication devices 16 also communicate control information with the network 14 to control call setup, teardown and processing as well as call services. The communication devices 16 comprise IP or other digital telephones, personal and other suitable computers or computing devices, personal digital assistants (PDAs), cell or other mobile telephones or any other device or set of devices such as the telephone 18 and gateway 20 combination capable of communicating real-time audio, video and/or other information over the network 14.

The communication devices 16 and telephones 18 may comprise any suitable input/output device for transmitting and/or receiving voice and other suitable data. In one embodiment, the communication devices 16, telephones 18 and other endpoints, or termination devices, may comprise dual-tone multi-frequency (DTMF) keys, a web interface, audio command interface, hard and/or soft keys for dialing numbers and entering commands associated with a dialed number or ongoing call. In addition, the endpoints may include a monitor or other display with a bitmap or other graphical interface for displaying information associated with a call to the corresponding user.

For voice calls, the communication devices 16 comprise real-time applications that play traffic as it is received or substantially as it is received into which packet delivery cannot be interrupted without severely degrading performance. A codec (coder/decoder) converts audio, video or other suitable signals generated by users from analog signals into digital representation. The digital encoded data is encapsulated into IP or other suitable packets for transmission over the network 14. IP packets received from the network 14 are converted back into analog signals and played to the user. It will be understood that the communication devices may otherwise suitably encode and decode signals transmitted over or received from the network 14.

The gateway 20 provides conversion between analog and/or digital formats. The standard analog telephones 18 communicate standard telephony signals through PSTN 22 to the gateway 20. At the gateway 20, the signals are converted to IP packets in the VoIP format. Similarly, VoIP packets received from the network 14 are converted into standard telephony signals for delivery to the destination telephone 18 through PSTN 22. The gateway 20 also translates between analog the network call control system and the Integrated Services Digital Network (ISDN) protocol and other signaling protocols used in PSTN 22. In one embodiment, the network 14 includes a call manager 30, a conference bridge 32 and one or more music-on-hold servers 34.

The call manager 30, the conference bridge 32, and the music-on-hold servers 34 may be located in a central facility or have their functionality distributed across and/or at the periphery of the network 14. The call manager 30, the conference bridge 32, and the music-on-hold servers 34 are connected to the network 14 by any suitable type of wireline or wireless link. In another embodiment, the network 14 may be operated without the call manager 30, in which case the communication devices 16 may communicate control information directly with each other or with other suitable network elements. In this embodiment, services are provided by the communication devices 16 and/or other suitable network elements.

The call manager 30 manages calls in the network 14. A call is any communication session between two or more parties. The parties may be persons and/or equipment such as computers. The sessions may include real-time connections, connections having real-time characteristics, non real-time connections and/or a combination of connection types.

The call manager 30 is responsive to service requests from the communication devices 16, including the standard telephones 18 through the gateway 20. For example, the call manager 30 may provide voice mail, bridging, multicasting, call hold, conference call and other multiparty communications and/or other suitable services for the communications devices 16. The call manager 30 provides services by performing the services, controlling performance of the services, delegating performance of the services and/or by otherwise initiating the services.

The conference bridge 32 provides conference call and other suitable audio, video, and/or real-time multiparty communication sessions between communication devices 16. In particular, the conference bridge 32 receives media from participating devices 16 and, using suitable signal processing techniques, mixes the media to produce conference signals. The media may be voice data from a conference call or other transmission including an audio component. The multiparty communication session includes three or more parties exchanging audio and/or other suitable information. During normal operation, each device 16 receives a conference signal that includes contributions from other participating devices.

The music-on-hold servers 34 comprise music, advertising and other streaming content for playing to a user while on hold. In one embodiment, the music-on-hold streams are multicast in the network 14 and the call manager 30 provides on-hold content to endpoints in response to another endpoint placing the call on-hold. Thus, if a conference participant places their associated endpoint on-hold, the call manager 30 may play music-on-hold to the conference bridge which is disruptive to the ongoing conference.

In operation, a call initiation request is first sent to the call manager 30 when a call is placed over the network 14. The call initiation request may be generated by a communication device 16 and/or the gateway 20 for telephones 18. Once the call manager 30 receives the call initiation request, the call manager 30 sends a signal to the initiating communication device 16 and/or gateway 20 for telephones 18 offering to call the destination device. If the destination device can accept the call, the destination device replies to the call manager 30 that it will accept the call. By receiving this acceptance, the call manager 30 transmits a signal to the destination device causing it to ring. When the call is answered, the call manager 30 instructs the called device and the originating device to begin media streaming to each other. If the originating device is a PSTN telephone 18, the media streaming occurs between the gateway 20 and the destination device. The gateway 20 then transmits the media to telephone 18.

For conference calls, the call manager 30 identifies participants based on the called number or other suitable criteria. The call manager 30 controls the conference bridge 32 to set up, process and tear down conference calls and other multiparty communication sessions. During the multiparty communications sessions, participants are connected and stream media through the conference bridge 32. The media is cross connected and mixed to produce conference output streams for each participant. The conference output stream for a participant includes the media of all other participants, a subset of other participants or other suitable mix dictated by the type of multiparty session and/or the participant.

In a particular embodiment, as described in more detail below, the conference bridge 32 controls audio content during a conference call or other suitable multiparty communication session by employing active users to signal their active participation and holding, terminating or otherwise disabling media from inactive users to prevent music and other on-hold content from disrupting an ongoing conference. As a result, active participation of an administrator may not be necessary for a conference and any user may initiate processing to disable media from on-hold endpoints. Thus, participants in a "meet me" conference may eliminate disruptive music-on-hold and users of an ad-hoc conference may remove voice mail and other automated recording systems from participating in a conference. The control signals for on-hold handling may comprise call signaling messages and be generated by the communication devices 16, telephones 18 and/or gateway 20 by or in response to a hard key, a soft key, a feature button or a sequence of keypad presses.

Figure 2:
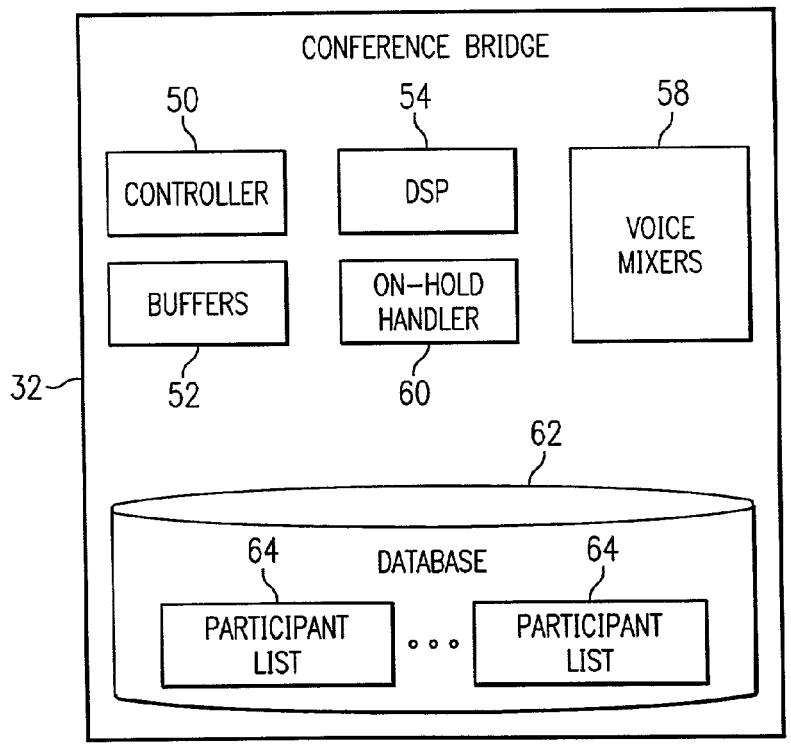
FIG. 2 is a block diagram illustrating details of the conference bridge of FIG. 1 in accordance with one embodiment of the present invention.

FIG. 2 illustrates details of the conference bridge 32 in accordance with one embodiment of the present invention. In this embodiment, the conference bridge 32 provides real-time multiparty audio connections, or conference calls, between three or more participants. It will be understood that the conference bridge 32 may support other types of suitable multiparty communications sessions including real-time audio streams without departing from the scope of the present invention.

Referring to FIG. 2, conference bridge 32 includes controller 50, buffers 52, digital signal processors (DSP) 54, voice mixers 58, an on-hold handler 60 and database 62. The controller 50, buffers 52, DSP 54, voice mixers 58, on-hold handler 60 and database 62 may comprise logic encoded in media. Logic comprises functional instructions for carrying out programmed tasks. The media comprises computer disks or other suitable computer-readable media, applications specific integrated circuits (ASIC), field programmable gate arrays (FPGA), digital signal processor (DSP) or other suitable specific or general purpose processors, transmission media or other suitable media in which logic may be encoded and utilized.

The controller 50 directs the other components of the conference bridge 32 and communicates with the call manager 30 to set up, process and tear down conference calls. The controller 50 also receives control signals from participants either directly from the communication devices 16 or through the call manager 30. The control signals may be requests for on-hold processing to remove on-hold content from an ongoing conference call. The control signals may also be responses from participants indicating their active participation in the conference call and may be other responses to queries by the on-hold handler 60 and other elements of the conference bridge 32. As used herein, the term each means every one of at least a subset of identified items. The control signals that pertain to on-hold processing may be forwarded to the on-hold handler 60 for processing.

The buffers 52 include input and output buffers. The input buffers receive and buffer packets of input audio streams from participants for processing by the conference bridge 32. The output buffers receive and buffer conference output streams generated by the conference bridge 32 for transmissions to participants. In a particular embodiment, a particular input buffer or set of input buffer resources are assigned to each audio input stream and a particular output buffer or set of output buffer resources are assigned to each conference output stream. The input and output buffers may be associated with corresponding input and output interfaces and perform error check, packet loss prevention, packet ordering and congestion control functions.

The DSP 54 include input and output transcoders. The input transcoders may receive input packets of a participant from a corresponding buffer in a specific compression, for example, G.729, and transcode the packet from the compressed format of the participant's device 16 to a standard G.711 uncompressed representation of the conference bridge 32 for processing in the voice mixers 58. Similarly, the output transcoders may receive conference output streams for participants in the standard G.711 format and convert or transcode the conference output streams to match the compression algorithm of the participant's devices. In this way, the conference bridge 32 allows participants to connect using a variety of devices and compression algorithms.

The voice mixers 58 include a plurality of summers or other suitable signal processing resources each operable to sum, add or otherwise combine a plurality of input streams into conference output streams for participants in a conference call. Once the voice mixers 58 have generated the conference output streams, each conference output stream is compressed by a corresponding DSP algorithm and buffered by a corresponding output buffer for transmission to the corresponding participant.

In one embodiment, each participant is assigned a mixer or summer that receives audio input streams from each other active participant to the conference. The summer combines the audio input streams to generate a conference output stream for delivery to the participant.

Prior to the voice mixers 58, one or more filters may be employed to filter out in-band command signals so that other users will not hear the signals. In that particular embodiment, in-band participant responses to on-hold queries whether by a DTMF signal or a spoken response are filtered out prior to the mixers 58.

The on-hold handler 60 disables on-hold and other disruptive content from an ongoing conference call. In one embodiment, the on-hold handler 60 prompts participants as to whether they are actively participating in a conference call in response to a request by a participant indicating disruptive content is being streamed into the conference call. Users who respond promptly are determined to be active while those who do not respond in time are determined to be on hold. In a particular embodiment, participants may have between five and ten seconds to respond. To recognize DTMF, spoken and/or other responses, the on-hold handler 60 may include DSP, adapted speech recognition and other response recognition resources.

After identifying inactive users, or endpoints on-hold, the on-hold call handler 60 disables media from the on-hold endpoints. The media may be disabled by terminating the endpoint from the conference call or dropping media from the conference call prior to the voice mixers 58 or holding and/or suspending the call. While media from an endpoint is suspended from entering the voice mixers 58 and being provided to other participants of the conference call, the media from the other the participants may nevertheless continue to be provided to the on-hold endpoint.

In addition, the on-hold handler 60 may continuously, periodically and/or otherwise repetitively prompt on-hold endpoints to communicate their on-hold status and invite the participant to re-register by responding with a re-join request. The re-join request may be any suitable signal recognizable by the on-hold handler 60 as an indication that the previously on-hold endpoint is no longer on-hold. Alternatively, DSP resources in the on-hold call handler 60 may recognize when music-on-hold is replaced by a human voice and also may recognize when music-on-hold is first played by an endpoint into the conference call. In this embodiment, the on-hold handler 60 may not wait for a request by a user to begin processing to identify and/or disable on-hold endpoints.

As participants are disabled and/or re-enabled, the on-hold handler 60 may update a participant list for the conference call in the database 62. Upon each update, the on-hold handler 60 may publish and/or otherwise provide the updated list of active participants to all of the active participants of the conference call. The list may be provided with the data of the call or over a separate channel. In addition, the controller 50 may provide the participant and/or active participant list to an endpoint upon request. Thus, at any point in time, each active participant may be able to determine other active participants of the conference call.

The on-hold handler 60 and/or controller 50 may additionally validate requests by participants and/or participant responses. In a particular embodiment, the conference bridge 32 may require a user ID and/or password from each participant to indicate that they remain active or to initiate processing to remove on-hold media from the conference call. In another embodiment, no requirement is made for any participant to possess special privileges in order to handle participants on-hold.

The database 62 includes a list of conference participants 64 for each ongoing conference call of the conference bridge 32. The list 64 for each conference call may include an identification of participants and a current status of the participants. In one embodiment, the participants are identified at the beginning of a conference call based on caller ID, phone number or other suitable identifier. The status may comprise one or more of connected, not connected, on-hold, inactive, active, and the like.

FIG. 3 illustrates a data structure for the conference participant list 64 in accordance with one embodiment of the present invention. In this embodiment, the conference participant list 64 is stored in a database table for each ongoing conference call. It will be understood that the conference participant list 64 may be otherwise suitably stored without departing from the scope of the present invention.

Referring to FIG. 3, the participant list 64 includes a participant column 70 uniquely identifying participants to the corresponding conference call, a port column 72 associating the users with a particular port of the conference bridge 32 and a status column 74 detailing a current status of the corresponding participant to the conference call. In the exemplary table 64, participant "Jane Smith" is connected to the conference bridge 32 on port "3" and is currently "enabled". Participant "John Jones" is connected to the conference bridge 32 on port "7" and is currently "disabled" due to being on-hold or otherwise inactive. Participant "Phil Williams" is connected to the conference bridge 32 on port "18" and is currently "enabled".

FIG. 4 illustrates a method for disabling media from endpoints with inactive participants to a conference call in accordance with one embodiment of the present invention. The method begins at step 100 in which the conference call is established. The conference call may be established by the conference bridge 32 in response to instructions from the call manager 30.

Proceeding to step 102, the conference bridge 32 receives an indication of on-hold content from an endpoint to the conference call. The indication may be a user request for on-hold processing or may be based on analysis of conference call content by the conference bridge 32. If the indication is based on a user request and validation, or authorization is required, such authorization is performed at step 102.

At step 104, each participant is prompted to signal active participation in the conference call. At step 106, responses are received from active participants. The method may wait at step 106 for a specified period of time in order to allow all active participants to respond. As previously discussed, the period of time may be between five, ten seconds or other suitable period of time. In a specific embodiment only endpoints that stream voice packets above a threshold energy into the conference bridge are prompted and/or expected to respond. Whether an endpoint is actively streaming voice or other packets may be determined by the conference bridge controller 50 monitoring the buffers 52. In this embodiment, non offending endpoints on hold are not dropped.

At step 108, devices with inactive participants are identified. In one embodiment, the devices with inactive participants are devices for which a response was requested and from which no response was received. At step 110, media from the devices with inactive participants is disabled. In this way, disruptive music-on-hold content is not streamed into the conference call and/or is removed from the conference call.

At step 112, the participant list 64 is updated to indicate the current status of all participants. At step 114, the updated list may be broadcast to the active or other participants. In addition, or alternatively, the participant list may be provided to participants upon request. Step 114 leads into the end of the process in which users are employed to signal their active participation in a conference call to allow on-hold endpoints to be disabled without administrative intervention.

FIG. 5 is a flow diagram illustrating a method for enabling media from active participants re-joining a conference call in accordance with one embodiment of the present invention. The method begins at step 150 in which participants to a conference call with disabled media are identified. Such participants may be identified by the on-hold handler 60 by accessing the participant list 64.

Proceeding to step 152, the on-hold handler 60 may inform each inactive participant with disabled media of their status. The prompts of the on-hold processor 60 may be audio, visual or other suitable prompts operable to indicate to the participant what response is necessary on his or her part to continue being considered an active participant to the conference call.

At step 154, each inactive participant is invited to re-join the conference call. The invitations may be played on a timed or other periodic basis. At decisional step 156, if the on-hold handler 60 does not receive a re-join request from an endpoint, the process continues along the No branch to decisional step 157. At decisional step 157 a determination is made whether the conference has ended. If the conference has not ended, the process follows the No branch back to step 154. If the conference has ended, the process follows the Yes branch to step 159, where the inactive participants are disconnected and the process ends.

If at decisional step 156 the on-hold handler 60 receives a re-join request from an endpoint, the Yes branch of decisional step 156 leads to step 158 at which the media from the device of the re-joining participant is enabled. The media may be enabled by adding the media back to the mixers of the other participants or by otherwise reversing the actions taken to disable the media. At step 160, the participant list 64 is updated and then broadcast at step 162. Step 162 as well as No branch of step 156 leads to the end of the process in which an on-hold participant is allowed to re-join an ongoing conference call.

Although the present invention has been described with several embodiments, various changes and modifications may be suggested to one skilled in the art. It is intended that the present invention encompass such changes and modifications as fall within the scope of the appended claims.

What is claimed is:

1. A method for controlling audio content during a multiparty communication session, comprising:
   establishing a multiparty communication session involving a plurality of participants, each participant associated with a device;
   after establishing the multiparty communication session, prompting the participants to identify themselves as active participants; and
   disabling media from a particular device previously used by one of the participants and from which no active participant is identified to terminate communication of the media from the particular device to other devices in the multiparty communication session.

2. The method of claim 1, further comprising prompting the participants to identify themselves in response to at least a request from one of the participants.

3. The method of claim 2, further comprising authenticating the request.

4. The method of claim 3, wherein authenticating the request comprises authenticating the participant making the request.

5. The method of claim 1, further comprising disabling media from each device from which no active participant is identified.

6. The method of claim 1, wherein the disabled media comprises on-hold content.

7. The method of claim 1, further comprising receiving a response to the prompt from at least one participant via a dual-tone multi-frequency (DTMF) command.

8. The method of claim 1, further comprising utilizing adaptive speech recognition to identify responses from participants.

9. The method of claim 1, further comprising filtering out responses to the prompt to prevent communication of the responses to the other devices in the multiparty session.

10. The method of claim 1, further comprising periodically playing to the particular device for which the media is disabled a prompt inviting the participant to re-join the multiparty communication session.

11. The method of claim 10, further comprising enabling media from the particular device in response to at least receiving a re-join request from the particular device.

12. The method of claim 1, further comprising identifying to the active participants a list of the active participants.

13. The method of claim 12, further comprising identifying the list of active participants to a particular active participant in response to a query by the particular active participant.

14. The method of claim 1, wherein each active participant identifies himself with a secure signal.

15. The method of claim 14, wherein the secure signal comprises a password.

16. The method of claim 1, further comprising:
   determining devices connected to the multiparty communication session streaming voice packets; and
   disabling media from each device streaming voice packets and from which no active participant is identified.

17. A system for controlling audio content during a multiparty communication session, comprising:
   means for establishing a multiparty communication session involving a plurality of participants, each participant associated with a device;
   means for, after establishing the multiparty communication session, prompting the participants to identify themselves as active participants; and
   means for disabling media from a particular device previously used by one of the participants and from which no active participant is identified to terminate communication of the media from the particular device to other devices in the multiparty communication session.

18. The system of claim 17, further comprising means for prompting the participants to identify themselves in response to at least a request from one of the participants.

19. The system of claim 18, further comprising means for authenticating the request.

20. The system of claim 19, wherein the means for authenticating the request comprises means for authenticating the participant making the request.

21. The system of claim 17, further comprising means for disabling media from each device from which no active participant is identified.

22. The system of claim 17, wherein the disabled media comprises on-hold content.

23. The system of claim 17, further comprising means for receiving a response to the prompt from at least one participant via a dual-tone multi-frequency (DTMF) command.

24. The system of claim 17, further comprising means for utilizing adaptive speech recognition to identify responses from participants.

25. The system of claim 17, further comprising means for filtering out responses to the prompt to prevent communication of the responses to the other devices in the multiparty session.

26. The system of claim 17, further comprising means for periodically playing to the particular device for which the media is disabled a prompt inviting the participant to re-join the multiparty communication session.

27. The system of claim 26, further comprising means for enabling media from the particular device in response to at least receiving a re-join request from the particular device.

28. The system of claim 17, further comprising means for identifying to the active participants a list of the active participants.

29. The system of claim 28, further comprising means for identifying the list of active participants to a particular active participant in response to a query by the particular active participant.

30. The system of claim 17, wherein each active participant identifies himself with a secure signal.

31. The system of claim 30, wherein the secure signal comprises a password.

32. The system of claim 17, further comprising:
means for determining devices connected to the multiparty communication session streaming voice packets; and
means for disabling media from each device streaming voice packets and from which no active participant is identified.

33. A system for controlling audio content during a multiparty communication session, comprising media encoded in logic and operable to:
establish a multiparty communication session involving a plurality of participants, each participant associated with a device;
after establishing the multiparty communication session, prompt the participants to identify themselves as active participants; and
disable media from a particular device previously used by one of the participants and from which no active participant is identified to terminate communication of the media from the particular device to other devices in the multiparty communication session.

34. The system of claim 33, the logic further operable to prompt the participants to identify themselves in response to at least a request from one of the participants.

35. The system of claim 34, the logic further operable to authenticate the request.

36. The system of claim 35, the logic further operable to authenticate the request by authenticating the participant making the request.

37. The system of claim 33, the logic further operable to disable media from each device from which no active participant is identified.

38. The system of claim 33, wherein the disabled media comprises on-hold content.

39. The system of claim 33, the logic further operable to receive a response to the prompt from at least one participant via a dual-tone multi-frequency (DTMF) command.

40. The system of claim 33, the logic further operable to utilize adaptive speech recognition to identify responses from participants.

41. The system of claim 33, the logic further operable to filter out responses to the prompt to prevent communication of the responses to the other devices in the multiparty session.

42. The system of claim 33, the logic further operable to periodically play to the particular device for which the media is disabled a prompt inviting the participant to re-join the multiparty communication session.

43. The system of claim 42, the logic further operable to enable media from the particular device in response to at least receiving a re-join request from the particular device.

44. The system of claim 33, the logic further operable to identify to the active participants a list of the active participants.

45. The system of claim 44, the logic further operable to identify the list of active participants to a particular active participant in response to a query by the particular active participant.

46. The system of claim 33, wherein each active participant identifies himself with a secure signal.

47. The system of claim 46, wherein the secure signal comprises a password.

48. The system of claim 33, the logic further operable to:
determine devices connected to the multiparty communication session streaming voice packets; and
disable media from each device streaming voice packets and from which no active participant is identified.

49. A method for handling on-hold endpoints in a conference call, comprising:
receiving an audio stream from each of a plurality of participants to a conference call;
receiving a control signal from a participant to the conference call indicating the conference call is receiving on-hold content from at least one on-hold endpoint;
prompting each participant to send a reply to a prompt;
receiving replies from active participants to the conference call; and
terminating media from devices associated with each participant not sending a reply.

50. A conference bridge, comprising:
an input buffer operable to receive and buffer audio streams generated by participants of a multiparty communication session;
a cross-connect operable to cross-connect an audio stream from each participant to conference output stream generators for remaining participants;
the conference stream output generator for each participant operable to combine each audio stream received from the cross-connect multiple independently controlled by the participant and to generate a conference output stream for the participant;
an output buffer operable to receive and buffer the conference output streams for transmission to the participant; and
an on-hold handler operable in response to a participant request to communicate with the participants, to identify active participants and to disable audio streams generated by devices associated with non-active participants.

* * * * *